United States Patent [19]

Sexton et al.

[11] Patent Number: 5,012,492
[45] Date of Patent: Apr. 30, 1991

[54] APPARATUS AND METHOD FOR DETECTING A CARRIER SIGNAL

[75] Inventors: Daniel W. Sexton; Timothy J. Williams, both of Charlottesville, Va.

[73] Assignee: GE Fanuc Automation North America, Inc., Charlottesville, Va.

[21] Appl. No.: 415,691

[22] Filed: Sep. 29, 1989

[51] Int. Cl.⁵ .............................................. H03D 3/04
[52] U.S. Cl. ..................................... 375/82; 328/138; 329/303
[58] Field of Search .................. 375/76, 80, 82, 88; 329/300, 303, 311, 341, 343; 455/214, 229; 328/119, 136, 138, 139, 149; 371/57.2; 370/110.3; 364/724.09, 484

[56] References Cited

U.S. PATENT DOCUMENTS

| | | | |
|---|---|---|---|
| 3,958,183 | 5/1976 | Schaefer | 328/138 |
| 4,047,114 | 9/1977 | Lane et al. | 329/343 |
| 4,232,267 | 11/1980 | Hanajima et al. | 329/343 |
| 4,485,448 | 11/1984 | Kurth | 328/138 |
| 4,554,508 | 11/1985 | Haque | 455/229 |
| 4,737,984 | 4/1988 | Brown | 328/138 |

OTHER PUBLICATIONS

"Single-Channel Phase-Coherent-FSK Bus Physical Layer"; May, 1988; Token-Passing Bus-IEEE 802.4 Draft K; pp. 173-186.

Primary Examiner—Benedict V. Safourek
Attorney, Agent, or Firm—James H. Beusse

[57] ABSTRACT

A carrier detection circuit is provided for reliably detecting the presence of a carrier signal. The carrier detection circuit operates on a carrier signal which includes a first symbol exhibiting a first frequency representing a logic 1 and a second symbol exhibiting a second frequency representing a logic 0. A first carrier detect pulse exhibiting a first logic state is generated each time the carrier signal exceeds a predetermined threshold voltage. A plurality of consecutive first carrier detect pulses are checked to determine the logic state of each. A second carrier detect pulse is generated if it is determined that each of the plurality of consecutive first carrier detect pulses exhibit the first logic state.

9 Claims, 1 Drawing Sheet

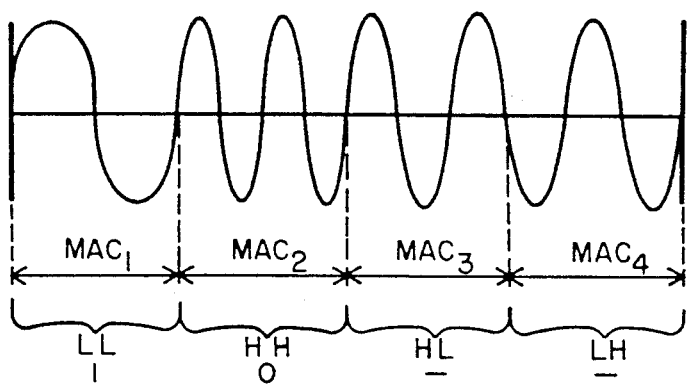
FIG. 1
(PRIOR ART)
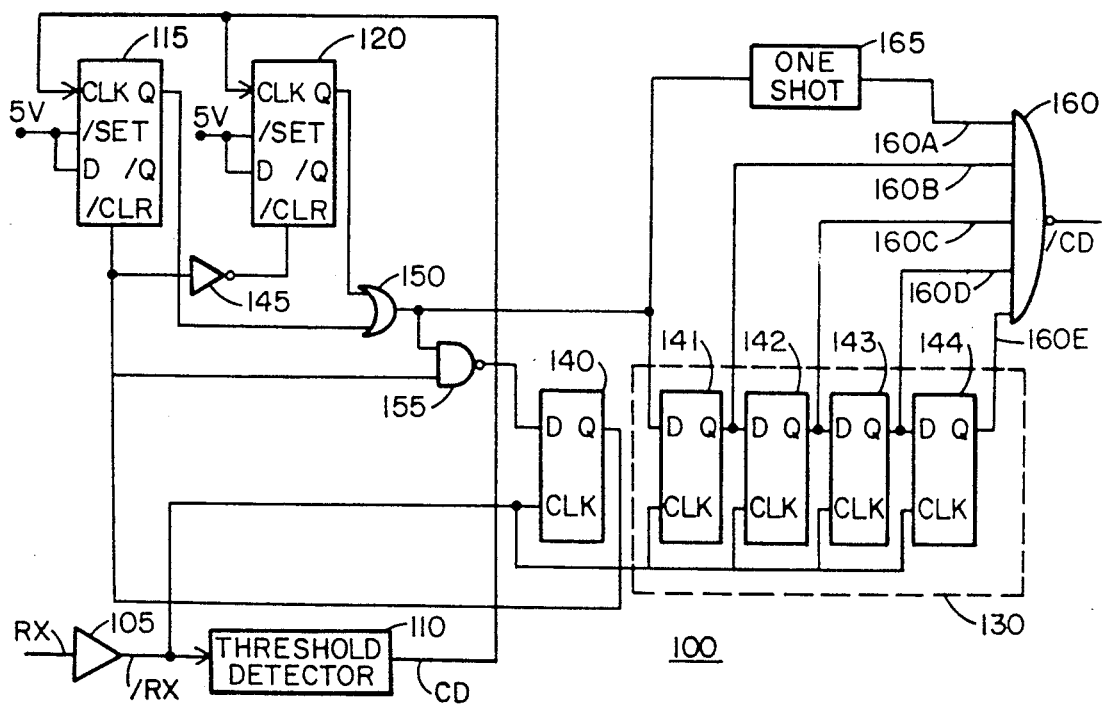
FIG. 2
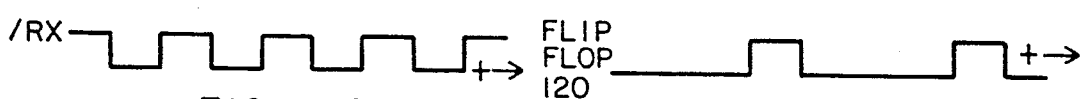

APPARATUS AND METHOD FOR DETECTING A CARRIER SIGNAL

FIELD OF THE INVENTION

This invention relates in general to signal processing circuits and, more particularly, to an apparatus and method for detecting a carrier signal.

BACKGROUND OF THE INVENTION

Carrier detection circuits are typically used in modems and other devices to detect the presence of frequency shifted and/or phase shifted carrier signals. To understand such carrier detection circuits, it is helpful to examine the operation of a signaling protocol which is often employed in modems. One such protocol often used in modems is the IEEE 802.4 carrier band modem protocol which is illustrated in FIG. 1 in the form of a graph showing time on the horizontal axis and signal amplitude on the vertical axis. In this protocol, information is conveyed via a frequency shift keyed (FSK) signal having two different frequency components. That is, the signal information of this protocol is conveyed by a combination of 5 MHz signals designated L (half cycle of 5 MHz) and 10 MHz signals designated H (full cycle of 10 MHz). A bit of information is conveyed or encoded on a carrier during each of a plurality of successive medium access cycle (MAC's), designated $MAC_1$, $MAC_2$, $MAC_3$, $MAC_4$, . . . . Each MAC is defined to exhibit a time period equal to the period of a 5 MHz signal, that is, one full cycle thereof.

To convey a logical 1 during an MAC, a full cycle of 5 MHz (or LL) is transmitted during that MAC. Thus it may be said that a full cycle of 5 MHz (two successive half cycles of 5 MHZ) is the symbol which represents a logical 1. To convey a logical 0 during another MAC, two successive full cycles of 10 MHz (or HH) are transmitted during that MAC. Thus, as seen in FIG. 1, to simplify matters, LL=1, HH=0, and LH and HL represents non-data. In more detail, in the example of FIG. 1, an LL representing a logical 1 is transmitted during $MAC_1$ and an HH representing a logical 0 is transmitted during $MAC_2$. During $MAC_3$ and $MAC_4$ an HL and an LH are respectively transmitted, each representing non-data.

In the past, the carrier detect circuits employed with such protocols as the IEEE 802.4 carrier band modem protocol have been relatively simple threshold envelope detectors which detect when the received signal has exceeded a predetermined threshold level. When the received signal does exceed a predetermined threshold level, a window is opened and the signal is said to be present for a fixed period of time. Unfortunately, noise in such systems can randomly open this window as well as the desired received signal can open the window. To reduce the incidence of false carrier detection, it is desirable that only received signals exhibiting a signal level greater than a first level and less than a second level be detected. Otherwise, the carrier detect signal and/or modem coupled thereto may not function properly. Those skilled in the art recognize that it is desirable to reduce the number of false carrier detections as much as possible.

As discussed earlier, the IEE 802.4 carrier band modem protocol employs two frequencies of transmission, namely 5 and 10 MHz, to convey data. When these two frequencies are transmitted over cable, these two frequencies are attenuated by different amounts, respectively. This differential attenuation effect becomes greater as the length of the cable is increased. Conventional carrier detection circuits will generally detect a valid signal at the beginning of a transmission if either one of these two frequencies exceeds the predetermined threshold level for carrier detection.

SUMMARY OF THE INVENTION

One object of the present invention is to provide a carrier detection circuit which more reliably detects a carrier signal and reduces the incidence of false carrier detection.

Another object of the invention is to provide a carrier detection circuit for IEEE 802.4 carrier band FSK signals which designates a detected carrier signal as valid when both the H and L signals exhibit an amplitude in excess of a predetermined threshold level.

Yet another object of the invention is to reduce the undesired effects of noise bursts which would otherwise tend to trigger a carrier detection circuit.

In accordance with the present invention, a carrier detection circuit is provided for detecting the presence of a carrier signal including a sequence of first symbols exhibiting a first frequency and second symbols exhibiting a second frequency. One embodiment of the carrier detection circuit of the present invention includes a threshold detector, responsive to the carrier signal, for generating a first carrier detect pulse exhibiting a first logic state each time one of the first and second symbols exhibits a voltage exceeding a predetermined threshold level and otherwise generating a first carrier detect pulse exhibiting a second logic state. The carrier detection circuit further includes a carrier detection pulse generator, coupled to the threshold detector, for generating a second carrier detect pulse if each of a plurality of consecutive first carrier detect pulses exhibits the first logic state.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

FIG. 1 is an amplitude vs. time representation of the IEEE 802.4 carrier band modem protocol;

FIG. 2 is a block diagram of one embodiment of the carrier detection circuit of the present invention;

FIG. 3A is a timing diagram showing the incoming received signal after such signal has been conditioned;

FIG. 3B is a timing diagram showing the carrier detect signal present at the output of a threshold detector employed in the present invention;

FIG. 3C is a timing diagram showing the carrier detect pulses caught by one flip flop employed in the present invention;

FIG. 3D is a timing diagram showing the carrier detect pulses caught by another flip flop employed in the present invention; and FIG. 3E is a timing diagram showing the threshold exceeded detect signal at the output of the threshold detection circuit of the present invention.

DETAILED DESCRIPTION OF THE INVENTION

In the embodiment of the invention now described, the term "incoming signal" is used to refer to the incoming two frequency signal discussed earlier and now designated the RX signal. FIG. 2 shows a detailed schematic diagram of one embodiment of the carrier detection circuit of the present invention as carrier detection circuit 100. Carrier detection circuit 100 includes a signal conditioning circuit 105, for example an amplifier, for amplifying the incoming signal, RX, which is supplied to input of amplifier 105. More specifically, conditioning circuit 105 amplifies the incoming signal RX up to a level sufficiently high for further processing by the remainder of carrier detection circuit 100. The amplified, conditioned incoming signal produced at the output of conditioning circuit 105 is designated $\overline{RX}$ and is supplied to the input of a conventional threshold detector 110 as shown in FIG. 2. In one embodiment of the invention, a comparator type threshold detector circuit is employed as threshold detector 110. A carrier detect signal, CD, is generated at the output of threshold detector 110. When the conditioned incoming signal $\overline{RX}$ provided to the input of threshold detector 110 exceeds a predetermined threshold voltage, the carrier detect signal CD changes state or transitions from 0 to 1 thus generating a logic pulse of 1. If the $\overline{RX}$ signal does not exceed this predetermined threshold voltage, then the CD carrier detect signal remains at 0 thus resulting in a logic pulse of 0. This carrier detect signal CD represents a coarse carrier detect as will be discussed in more detail subsequently.

Carrier detection circuit 100 further includes D flip flops 115 and 120. Flip flops 115 and 120 each include respective CLK (clock), D, $\overline{SET}$ and $\overline{CLR}$ (CLEAR-RESET) inputs, as well as Q and $\overline{Q}$ outputs. As seen in FIG. 2, the output of threshold detector 110 is coupled to the CLK inputs of flip flops 115 and 120 to provide the CD carrier detect signal to these CLK inputs. The CD signal thus provides the clock signal for flip flops 115 and 120. A source of DC voltage, for example 5 volts or other appropriate voltage, is coupled to the D and $\overline{SET}$ inputs of flip flops 115 and 120. Flip flops 115 and 120 alternatingly catch or intercept every other pulse of the CD carrier detect signal as will be discussed in more detail later.

Carrier detection circuit 100 further includes a 4 stage (4 bit) serial shift register 130. Shift register 130 is conveniently fabricated from a integrated circuit package such as the Motorola HCMOS 74HC174 which includes 6 D type flip flops, one of which is not used in this particular embodiment of the invention.

The remaining 5 D flip flops are designated 140, 141, 142, 143 and 144 of which flip flops 141–144 are employed to implement 4 stage shift register 130. Each of D flip flops 140–144 includes D inputs, CLK inputs and Q outputs, respectively.

Flip flop 140 is not used as part of shift register 130 but rather is used as a divide by two divider as now described. The output of amplifier 105 is coupled to the CLK clock input of D flip flop 140 such that the $\overline{RX}$ signal clocks flip flop 140. An inverter 145 is coupled between the $\overline{CLR}$ input of flip flop 115 and the $\overline{CLR}$ input of flip flop 120. The Q outputs of flip flops 115 and 120 are respectively coupled to the first and second intputs of a two input OR gate 150. The output of OR gate 150 is coupled to one of the two inputs of a NAND gate 155, the remaining input of which is coupled to the $\overline{CLR}$ input of flip flop 115 and to the Q output of flip flop 140. The output of AND gate 155 is coupled to the D input of flip flop 140.

Flip flops 115, 120 and 140 together with OR gate 150 and gate 155 cooperate to permit each of flip flops 115 and 120 to alternately catch every other CD signal pulse from threshold detector 110. For example, in a sequence of CD pulses generated by threshold detector 110, flip flop 115 will catch a first CD pulse, flip flop 120 will catch a second CD pulse, flip flop 115 will catch a third CD pulse and so forth. The CD pulses thus captured are provided to OR gate 150, such that if either flip flop 115 captures a CD pulse or flip flop 120 captures a CD pulse, such CD pulse is passed through OR gate 150 to the input of shift register 130, namely the D input of flip flop 141.

Shift register 130 acts as memory to store the 4 most recent CD pulses. In this particular embodiment of the invention, shift register 130 is fabricated from the aforementioned D flip flops by connecting the CLK inputs thereof together in common and by coupling the Q output of flip flop 141 to the D input of flip flop 142, the Q output of flip flop 142 to the D input of flip flop 143 and the Q output of flip flop 143 to the D input of flip flop 144. Therefore, the input of the serial shift register 130 thus formed is the D input of flip flop 141 and the output of shift register 130 is the Q output of flip flop 144. The output of conditioning amplifier 105 is coupled to the CLK (clock) inputs of flip flops 141–144 such that the $\overline{RX}$ conditioned incoming signal clocks shift register 130.

Carrier detection circuit 100 further includes a 5 input NAND gate 160 having inputs 160A–160E. A one shot device 165 having a normally low output is coupled between the output of OR gate 150 and NAND gate input 160A. For purposes of this discussion, it will be assumed that the output of one shot device 165 is low unless otherwise noted. One shot device 165 will be discussed later in more detail.

The Q outputs of the 4 stages of shift register 130 are respectively coupled to the remaining 4 inputs of NAND gate 160, namely inputs 160B–160E, such that information as to the presence (logical 1) or absence (logical 0) of a CD pulse at each of such stages is conveyed to NAND gate 160. In other words, information as to the content of the four stage shift register 130 for the last four clock pulses is conveyed to the respective inputs of NAND gate 160.

In the carrier detection circuit arrangement described above, if four successive CD pulses are generated indicating the $\overline{RX}$ signal exceeded the predetermined threshold for four transitions of the $\overline{RX}$ signal, then flip flops 115 and 120 will load four logical 1's into the respective registers 141–144 of shift register 130. When coincidence at the inputs of NAND gate 160 occurs in this manner, the output of NAND gate 160 (namely the $\overline{CD}$ true carrier detect signal) goes low indicating that a carrier has truly been detected. The $\overline{CD}$ carrier detect signal represents a fine carrier detect in comparison to the CD signal at the output of threshold detector 110 which is a relatively coarse carrier detect.

If, however, the $\overline{RX}$ signal fails to exhibit a sufficiently high amplitude to exceed the predetermined threshold during an MAC, then the CD signal would exhibit a logical 0 (no pulse) during such time. When this low incoming signal condition occurs, a CD pulse of logical 0 is generated at the output of threshold detector 110 in place of the normal CD pulse of logical 1. Either flip flop 115 or 120 detects the absence of the CD pulse and presents a logical 0 to the input of shift register 130 via OR gate 150. When shift register 130 is clocked, a logical 0 will be supplied to one of the inputs of NAND gate 160 causing the output of NAND gate 160 (that is, the $\overline{CD}$ signal) to go high signifying that a carrier has not been detected presently.

The operation of carrier detection circuit 100 is now discussed in more detail. Reference will be made to the timing diagrams of FIGS. 3A–E to further illustrate the operation of carrier detection circuit 100. Conditioning amplifier 105 amplifies the RX signal to produce a $\overline{RX}$ signal exhibiting a sufficiently high level to be capable of clocking divided by two flip flop 140 and flip flops 141-144 of shift register 130. In this manner, whatever the CD pulses (logical 1's or 0's) supplied to shift register 130 by flip flops 115 and 120 are shifted through shift register 130 by such clocking action. An example of the $\overline{RX}$ signal is illustrated in FIG. 3A.

It will be recalled that a CD pulse of logical 1 indicates that the $\overline{RX}$ signal has exceeded the predetermined threshold voltage associated with threshold detector 110, whereas a CD pulse of logical 0 indicates that the $\overline{RX}$ signal has not exceeded that predetermined threshold voltage. If the last four CD pulses from threshold detector 110 are all logical 1's such as in FIG. 3B, then such 4 CD pulses are clocked into shift register 130.

This loading of shift register 130 occurs because flip flop 115 catches or captures first, third, etc. CD pulses and flip flop 120 catches or captures second, fourth, etc. CD pulses as seen by comparing FIGS. 3C and 3D with FIG. 3B. FIG. 3C shows the CD pulses caught by flip flp 120. OR gate 150 combines the CD pulses from flip flop 115 and the CD pulses from flop 120 as shown in FIG. 3E. It is this combined sequence of CD pulses from flip flops 115 and 120 which are supplied to shift register 130 via OR gate 150. Thus, in the present example wherein the last four CD pulses from threshold detector 110 are all logical 1's as seen in FIG. 3E, such 4 CD pulses are all clocked into shift register 130 and are stored in the respective 4 stages thereof. When this occurs, the output of NAND gate 160 (the $\overline{CD}$ signal) goes low (logical 0) to indicate that a carrier has truly been detected. Such is the case when there are good signal conditions and the RX signal arrives at carrier detection circuit 100 with relatively high quality and exhibiting a low signal to noise ratio.

However, should the RX signal become degraded, it is possible that the $\overline{RX}$ signal still exhibits sufficient amplitude to clock flip flop 140 and shift register 130, but not sufficient amplitude to exceed the predetermined threshold associated with threshold detector 110. When this occurs the CD pulse from threshold detector 110 exhibits a logical 0 which is captured by one of flip flops 115 and 120. The logical 0 CD pulse thus captured is loaded into shift register 130 which causes the $\overline{CD}$ signal at the output of NAND gate 160 to go to a logical 1 since at least one of the inputs of NAND gate 160 exhibits a logical 0. When the $\overline{CD}$ signal goes to logical 1 in this manner, this indicates that a carrier is presently not detected.

Generally, transmission of an IEEE 802.4 protocol signal starts with a 101010 "dotting pattern" or preamble which enables synchronization with the signal prior to transmission of data thereon. Such a 1010101 dotting pattern results in the transmission of 5 MHz, 10 MHz, 5 MHz, and 10 MHz signals, alternatingly. When the carrier detection circuit 100 of the present invention operates on such a preamble signal, it assures that both the 5 MHz and 10 MHz components of the preamble exhibit an amplitude greater than the predetermined threshold voltage associated with threshold detector 110 before a $\overline{CD}$ signal indicating a carrier detect is generated. Since both the 5 and 10 MHz signals are alternately transmitted in the preamble, each can result in a CD pulse of logical 1 or logical 0 being generated by threshold detector 110 depending on the voltage level of the particular 5 or 10 MHz signal component.

Referring momentarily to the logical 1 and logical 0 transmitted during $MAC_1$ and $MAC_2$, respectively, in FIG. 1, it is seen that a 5 MHz signal in $MAC_1$ exceeding the predetermined threshold would result in one CD pulse of logical 1 being produced, whereas a 10 MHz signal in $MAC_2$ exceeding the predetermined threshold would result in two CD pulses of logical 1 being generated. Correspondingly, it is seen that a 5 MHz signal in $MAC_1$ less than, the predetermined threshold would result in one CD pulse of logical O being produced, whereas a 10 MHz signal in $MAC_2$ less than the predetermined threshold would result in two CD pulses of logical O being generated. Thus, if either the 5 MHz component or the 10 MHz component of the preamble exhibit an amplitude less the predetermined threshold, then at least one CD pulse of logical O would be generated. In this case, flip flops 115 and 120 will load shift register 130 with at least one logical O and the CD signal at the output of NAND 160 goes to logical 1 indicating loss or absence of carrier. In contrast, if both the 5 MHz component and the 10 MHz component of the preamble exhibit an amplitude greater than the predetermined threshold for a sufficiently long period of time, then four CD pulses of logical 1 would be generated and loaded into shift register 130. In this case, the CD signal at the output of NAND 160 goes to logical O indicating carrier detect. In a preferred embodiment of the invention, the one shot device 165 mentioned above is coupled between the output of OR gate 150 and input 160A of NAND gate 160. A time constant is associated with one shot device 165. The output of one shot device 165 is normally low (logical O). However, when one shot device 165 is toggled by an input signal, the output of one shot device 165 transitions to a high output state for a predetermined period of time determined by the time constant associated therewith. This predetermined period of time is substantially greater than one MAC. At the end of transmission, when all one's (1's) are loaded into the shift register and no transitions are present, one shot device 165 forces carrier detect off until the signal conditioner can recover and provide more transitions that will clock logical O's into, the shift register thus also forcing carrier detect off and resetting the circuit for the next input signal.

Although in the particular example shown above, a NAND gate has been used to implement the logic operation of testing the most recent 4 CD pulses for the presence or loss of carrier, those skilled in the art of digital circuit design will appreciate that an AND gate could be used as well to implement this function. Moreover, although in the above example 4 CD pulses were checked for coincidence at NAND gate 160, the carrier detect circuit would still operate if at least 3 CD pulses were checked for coincidence. Correspondingly, in such an arrangement, shift register 130 need only be 3 stages wide. The shift register 130 could be longer in order to provide more noise rejection.

While an apparatus for detecting a carrier signal has been described above, it will be appreciated that a method for detecting the presence of a carrier signal has also been disclosed. Such method involves the detection of a carrier signal including a sequence of first symbols exhibiting a first frequency and second symbols exhibiting a second frequency. This method includes the step of generating a first carrier detect pulse exhibiting a first logic state each time one of the first and second symbols exhibits a voltage exceeding a predetermined threshold level and otherwise generating a first carrier detect pulse exhibiting a second logic state. The method further includes the step of generating a second carrier detect pulse if each of a plurality of consecutive first carrier detect pulses exhibits the first logic state.

The foregoing describes an apparatus and method which provides for increased reliability in, the detection of a carrier signal. The apparatus and method designates a detected carrier signal as valid when both the first and second symbols thereof exhibit an amplitude in excess of the predetermined threshold level. Both the first and second symbols must exhibit sufficient levels before a carrier detect will be generated. Moreover, a single noise burst will not pulse CD four times and thus will not result in a false carrier detect. In this manner, the undesired effects of noise bursts which would otherwise tend to trigger a carrier detection circuit are substantially reduced.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A carrier detection circuit for detecting the presence of a carrier signal including a sequence of first symbols exhibiting a first frequency and second symbols exhibiting a second frequency, said circuit comprising:
   threshold detecting means, responsive to said carrier signal, for generating a first carrier detect pulse exhibiting a first logic state each time one of said first and second symbols exhibits a voltage exceeding a predetermined threshold level and otherwise generating a first carrier detect pulse exhibiting a second logic state; and
   carrier detection pulse generating means, coupled to said threshold detecting means, for generating a second carrier detect pulse only if each of a plurality of consecutive first carrier detect pulses exhibits said first logic state.

2. The carrier detection circuit of claim 1 wherein said plurality of consecutive first carrier detect pulses is at least equal to 3 first carrier detect pulses.

3. A carrier detection circuit for detecting the presence of a carrier signal including a sequence of first symbols exhibiting a first frequency and second symbols exhibiting a second frequency, said circuit comprising:
   threshold detecting means, responsive to said carrier signal, for generating a first carrier detect pulse exhibiting a first logic state each time one of said first and second symbols exhibits a voltage exceeding a predetermined threshold level and otherwise generating a first carrier detect pulse exhibiting a second logic state;
   memory means for receiving and storing a preselected plurality of consecutive first carrier detect pulses; and
   carrier detection pulse generating means, coupled to said memory means, for generating a second carrier detect pulse only if each of said preselected plurality of consecutive first carrier detect pulses exhibits said first logic state.

4. The carrier detection circuit of claim 3 wherein said memory means is a shift register.

5. The carrier detection circuit of claim 3 wherein said carrier detection pulse generating means is an AND logic gate.

6. The carrier detection circuit of claim 3 wherein said plurality of consecutive first carrier detect pulses is equal to at least 3 first carrier detect pulses.

7. A carrier detection circuit for detecting the presence of a carrier signal including a sequence of first symbols exhibiting a first frequency and second symbols exhibiting a second frequency, said carrier signal including a preamble in which said first and second symbols are alternatively transmitted every other symbol, said circuit comprising:
   threshold detecting means, responsive to said carrier signal, for generating a first carrier detect pulse exhibiting a first logic state each time one of said first and second symbols exhibits a voltage exceeding a predetermined threshold level and otherwise generating a first carrier detect pulse exhibiting a second logic state; and
   carrier detection pulse generating means, coupled to said threshold detecting means, for generating a second carrier detect pulse only if each of a plurality of consecutive first carrier detect pulses exhibits said first logic state, said second carrier detect pulse being generated only when both said first and second symbols exceed said predetermined threshold level.

8. A method for detecting the presence of a carrier signal including a sequence of first symbols exhibiting a first frequency and second symbols exhibiting a second frequency, said method comprising the steps of:
   generating a first carrier detect pulse exhibiting a first logic state each time one of said first and second symbols exhibits a voltage exceeding a predetermined threshold level and otherwise generating a first carrier detect pulse exhibiting a second logic state; and
   generating a second carrier detect pulse only if each of a plurality of consecutive first carrier detect pulses exhibits said first logic state.

9. A method for detecting the presence of a carrier signal including a sequence of first symbols exhibiting a first frequency and second symbols exhibiting a second frequency, said method comprising the steps of:
   generating a first carrier detect pulse exhibiting a first logic state each time one of said first and second symbols exhibits a voltage exceeding a predetermined threshold level and otherwise generating a first carrier detect pulse exhibiting a second logic state;
   storing a plurality of consecutive first carrier detect pulses;
   determining if each of said stored plurality of consecutive first carrier detect pulses exhibits said first logic state; and
   generating a second carrier detect signal only if each of said plurality of consecutive first carrier detect pulses exhibits said first logic state.

* * * * *